United States Patent [19]

Henderson

[11] 3,988,195

[45] Oct. 26, 1976

[54] MACHINE FOR APPLYING A SEMIPERMEABLE PATCH ON A PLASTIC BAG

[75] Inventor: Harold E. Henderson, Tyler, Tex.

[73] Assignee: National Distillers and Chemical Corporation, New York, N.Y.

[22] Filed: Jan. 27, 1976

[21] Appl. No.: 652,677

[52] U.S. Cl. ................................ 156/514; 156/556; 156/583

[51] Int. Cl.[2] ..................... B32B 31/00; B30B 15/34

[58] Field of Search ............ 156/513, 514, 583, 556

[56] References Cited

UNITED STATES PATENTS

| | | | |
|---|---|---|---|
| 2,865,261 | 12/1958 | Seragnoli | 156/583 |
| 3,115,731 | 12/1963 | Blythe et al. | 156/583 |
| 3,434,908 | 3/1969 | MacDonald | 156/583 |
| 3,490,979 | 1/1970 | Calvert et al. | 156/583 |

*Primary Examiner*—Douglas J. Drummond
*Attorney, Agent, or Firm*—Kenneth D. Tremain

[57] ABSTRACT

The machine includes a horizontal support for a plastic bag and a vertically movable heat-sealing head pivoted to the support for upward movement through an aperture in the support to contact the plastic bag. A vertically movable pressure platen having a vacuum head for holding a patch thereon is mounted directly above the heat-sealing head and is adapted to be moved into engagement with the plastic bag so that the patch can be heat-sealed to the bag. A cutter is mounted adjacent the pressure platen for reciprocating movement along an oblique path to intersect the aperture in the support directly beneath the pressure platen to provide a slit in the plastic bag prior to the heat-sealing of the patch on the bag over the slit.

5 Claims, 7 Drawing Figures

FIG.1
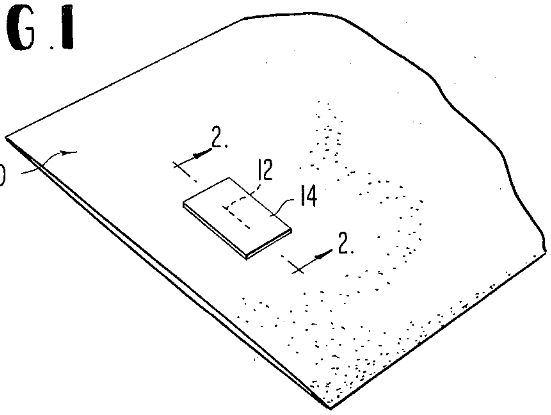
FIG.2
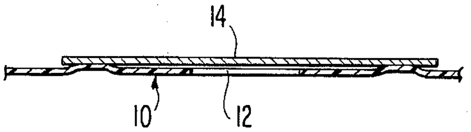
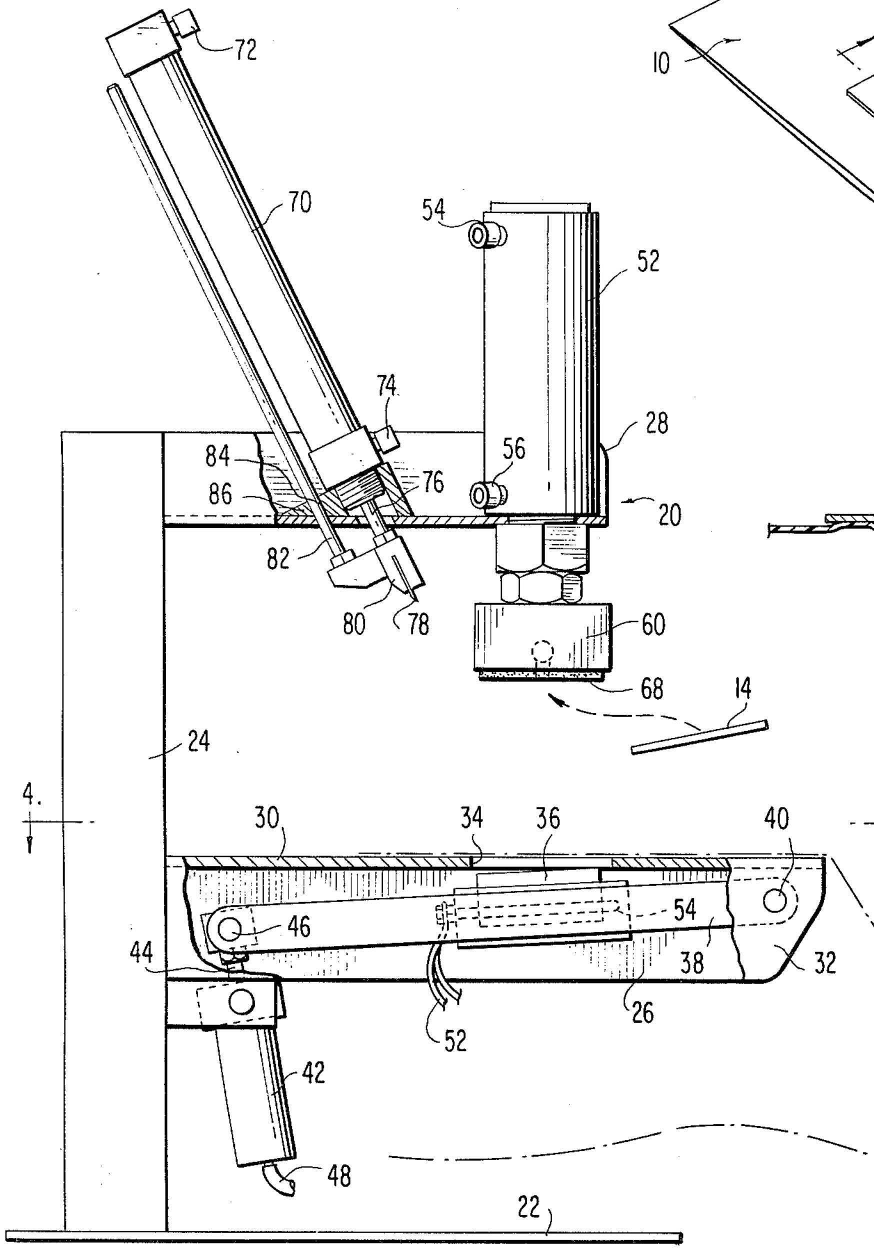
FIG.3
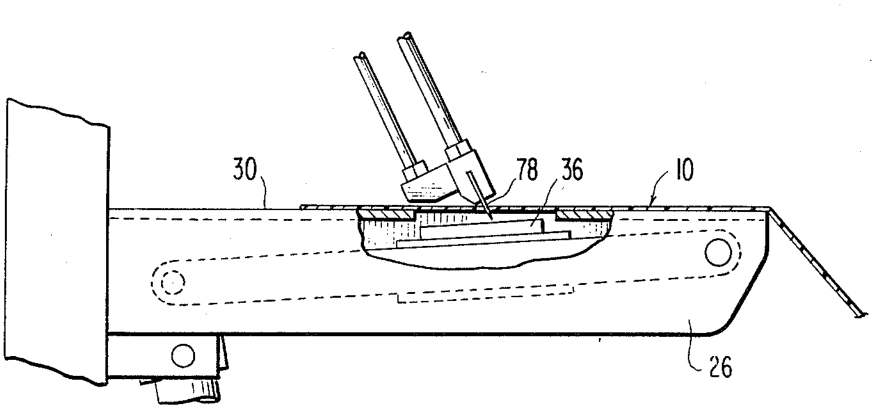
FIG.6

MACHINE FOR APPLYING A SEMIPERMEABLE PATCH ON A PLASTIC BAG

BACKGROUND OF THE INVENTION

1. Field of the Invention

The present invention is directed to a machine for heat-sealing a patch to a plastic article and more specifically to a machine for perforating a plastic bag and heat-sealing a semipermeable membrane to the plastic bag to cover the perforation.

2. Prior Art

For many years flexible containers such as plastic bags have been provided with spouts or valves by means of a machine which will first punch an opening in the plastic bag from one side and heat-seal a spout to the plastic material from the opposite side. Furthermore, the apparatus for carrying out this dual function is extremely complicated and expensive due to the fact that the heat-sealing head, the pressure platen and the punching apparatus are all disposed coaxially with respect to each other.

The use of plastic packages having a semipervious membrane covering an opening therein to facilitate the sterilization of the products are old and well known in the art. Such packages are generally made of polyolefin plastic material such as polyethylene, polypropylene, copolymers or mixtures of polyethylene and polypropylene. Generally, a low density polyethylene is used for the package and a spun-bonded, non-woven polyethylene sheet member such as TYVEK, produced by Dupont Chemical Company, is used for the semipermeable patch or membrane. Some of the prior art packages of this nature merely close the two edges which define the mouth of the package by means of a strip of the semipermeable material which can be heat-sealed to the plastic bag. Another type of package of this nature forms a continuous cut or slit in the plastic sheet material as it passes from a supply roll and subsequently heat-seals the sheet material into the form of a bag and applies an elongated patch of the semipermeable material over the slit. The completed bags are then severed from the continuous sheet of material. Still other prior art bags provide a plurality of perforations in the plastic bag and cover them with a heat-sealing tape which is applied by a completely separate operation. In general, the construction of all of the prior art bags of this nature either involve a completely automated system wherein the plurality of steps are performed in sequence automatically during the formation of the bag which results in extremely high equipment cost or else the perforations and patches are performed subsequently by individual independent steps which involve a considerable amount of bag handling which is both inefficient and time consuming.

SUMMARY OF THE INVENTION

The present invention provides a simple and economical machine for sequentially forming a perforation in a plastic bag and heat-sealing a semipervious patch of material such as TYVEK over the perforation subsequent to the formation of the bag but prior to the filling and closing of the bag.

The present invention provides a machine for perforating the plastic bag and applying a patch of semipervious material such as TYVEK over the perforation by means of a cutter and heat-sealing apparatus which are located at the same work station but which operate independently of each other and which are arranged non-coaxially relative to each other.

The present invention provides a machine having a horizontal support for a plastic bag and a vertically movable heat-sealing head pivoted to the support for upward movement through an aperture in the support to contact the plastic bag. A vertically movable pressure platen having a vacuum head for holding a patch thereon is mounted directly above the heat-sealing head and is adapted to be moved into engagement with the plastic bag so that the patch can be heat-sealed to the bag. A cutter is mounted adjacent the pressure platen for reciprocating movement along an oblique path to intersect the aperture in the support directly beneath the pressure platen to provide a slit in the plastic bag prior to the heat-sealing of the patch on the bag over the slit.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a partial perspective view of a plastic bag having a semipervious patch applied thereto.

FIG. 2 is a sectional view taken along the line 2-2 in FIG. 1.

FIG. 3 is a side elevation view, partly in section showing the machine according to the present invention.

FIG. 6 is a partial side elevational view of the work support arm, partly in section, showing the cutter in the fully extended cutting position.

DETAILED DESCRIPTION OF THE PREFERRED EMBODIMENTS

Figure 4:
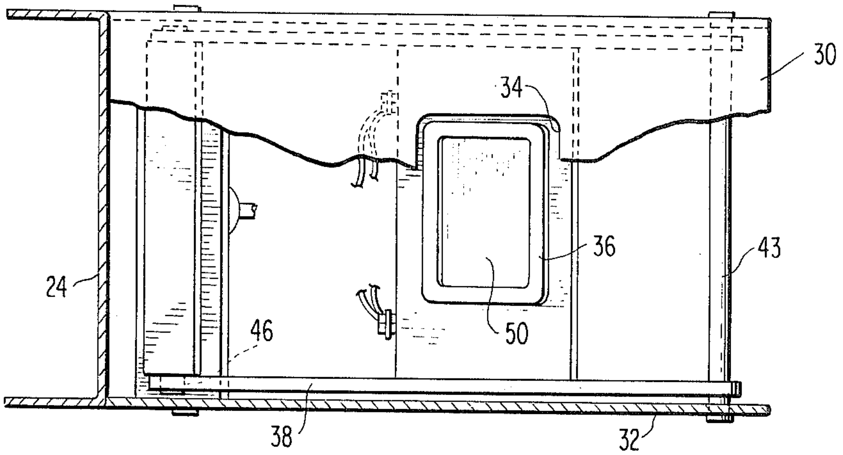
FIG. 4 is a top plan view, partly in section of the work support arm of the machine according to the present invention.
Figure 5:
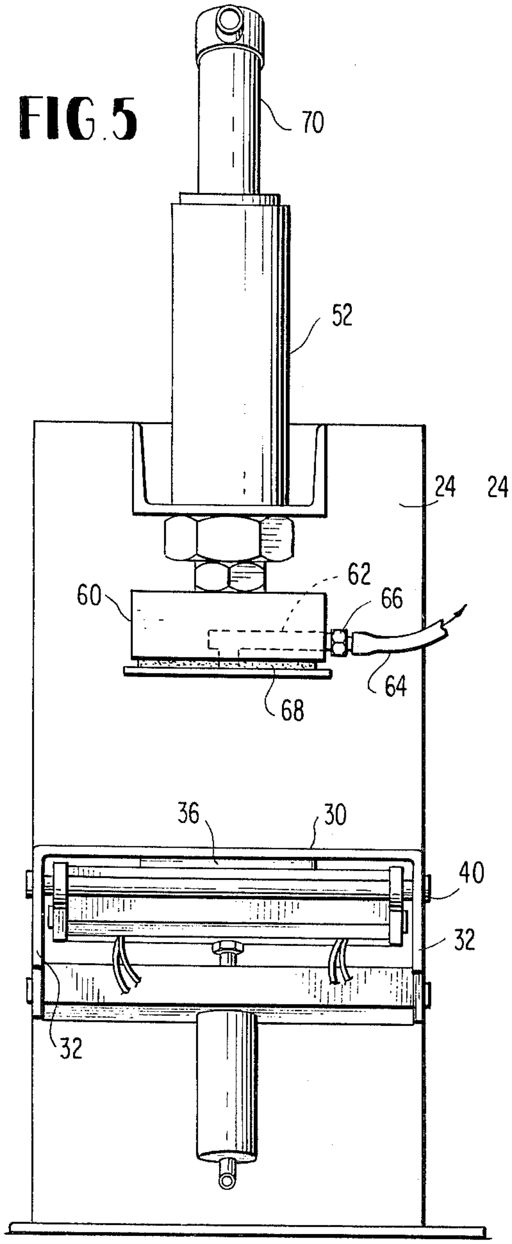
FIG. 5 is a front elevational view of the machine according to the present invention.

Packages, such as those formed by the plastic bag 10 shown in FIG. 1 are primarily for maintaining items in bacteria-free condition. After the items have been placed within the bag 10 and the bag opening sealed the items may be readily sterilized through the use of an active agent such as ethylene oxide and readily purged of the sterilizing agent. The active agent is introduced and removed from the sealed bag through a slit 12 which is covered by a patch 14 of semipermeable material. As indicated previously a suitable material for this purpose is produced by the Dupont Chemical Company under the name TYVEK. The slit 12 may be formed in the plastic bag and the patch 14 heat-sealed to the bag over the slit 12 by means of the machine 20 which is the subject of the present invention.

The machine 20 is comprised of a base 22 which is adapted to be placed on a table or any other suitable surface. A support column 24 is provided with a work support arm 26 and a tool support arm 28 which extend laterally therefrom in horizontal parallel spaced relationship with respect to each other. The work support arm is spaced above the base 22 to permit the placement of a bag 10, shown in dashed lines in FIG. 3, over the free-end of the arm 26. The arm 26 is comprised of a support plate 30 having a substantially flat upper surface and a pair of downwardly extending side flanges 32. The support plate 30 is provided with a substantially rectangular aperture 34 to provide access to both sides of the plastic material of the bag 10. A heat-sealing head 36 is mounted on an arm 38 pivoted to the side flanges 32 to 40 adjacent the free-end of the rigid support arm 26. The opposite end of the arm 38 is raised and lowered by means of a pneumatic actuator 42 having a piston rod 44 pivotally connected to the arm 38 at 46. The pneumatic actuator 42 is provided with a single acting piston and cylinder arrangement (not shown) which is conventional and pressurized air is supplied to the pneumatic actuator 42 through the holes 48. The heat-sealing head 36 is provided with a central recess 50 and is connected to a suitable source of electric power by means of wires 52. The detailed construction of the heating elements within the head 36 are conventional and have only been illustrated schematically in dotted lines 54 in FIG. 3.

Figure 7:
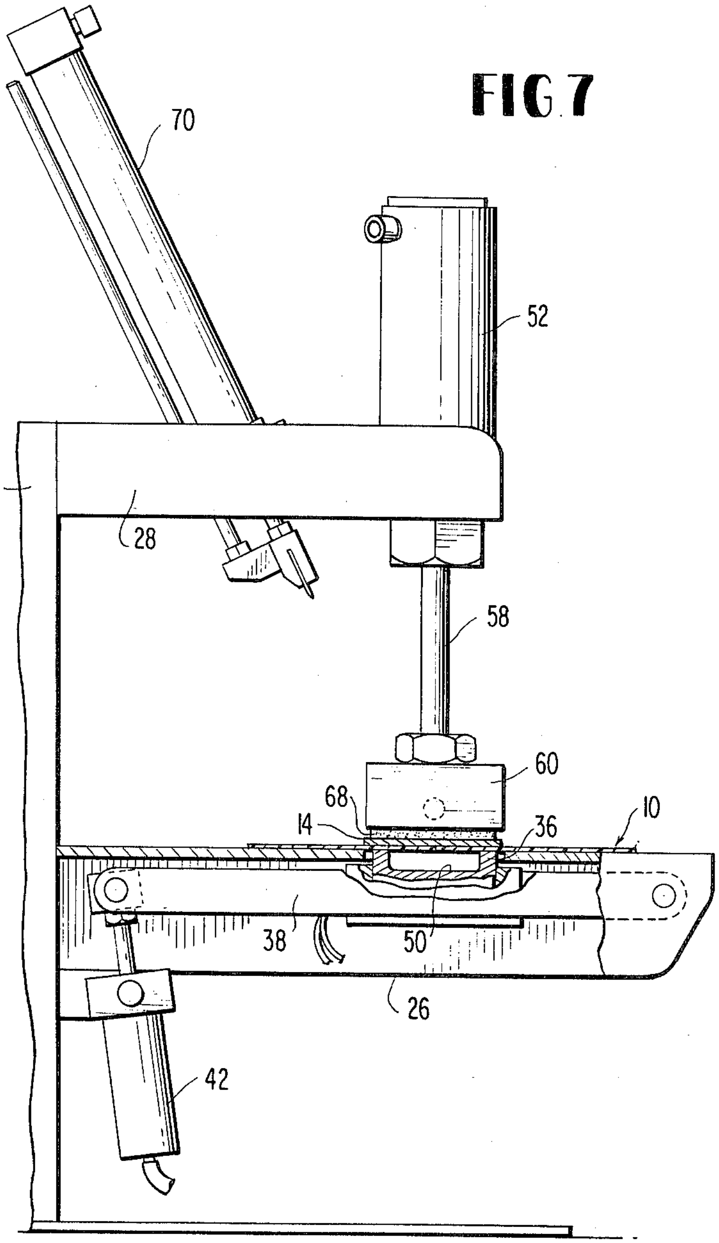
FIG. 7 is a side elevation view, partly in section, similar to FIG. 3 showing the heat-sealing means in operative heat-sealing position.

With the pneumatic actuator 42 in its non-actuated condition the parts will be disposed as shown in FIG. 3 with the heat-sealing head 36 disposed completely below the support plate 30. Upon actuation of the pneumatic actuator 42 the arm 38 will be pivoted upwardly to move the upper surface of the heat-sealing head 36 into substantially flush relation with the upper surface of the support plate 30 as shown in FIG. 7.

On the uppermost arm 28 a double acting pneumatic cylinder and piston device 52 is mounted with the longitudinal axis thereof vertically disposed directly above the aperture 34 in the work supporting plate 30. Suitable pneumatic connections 54 and 56 are provided for directing air under pressure to opposite sides of the piston (not shown) which is mounted for axial reciprocation within the unit. A piston rod 58 is connected to the piston and extends downwardly therefrom along a vertical axis. A vacuum head 60 is secured to the end of the piston rod 58 and is provided with an internal passage 62 which is connected at one end to a vacuum hose 64 by means of a fitting 66. The opposite end of the passage 62 communicates with the bottom surface of the vacuum head 60 in alignment with the axis of the actuator and a suitable pressure pad 68 is secured thereto by any suitable means. An aperture may be provided centrally of the pressure pad 68 in communication with the passage 62 or the entire pressure pad 68 may be constructed of a suitable air pervious material through which the air may readily diffuse. Upon an application of a vacuum through the conduit 64 a patch 14 can be held on the face of the pressure pad 68 for downward movement into engagement with the plastic bag 10.

Also mounted on the upper arm 28 is a second double acting pneumatic cylinder 70 having air inlet nozzles 72 and 74 for admitting air under pressure to opposite sides of a piston (not shown) which is slidably mounted within the unit. A piston rod 76 is secured to the piston and extends outwardly from the lower end of the unit 70 with the axis thereof intersecting the aperture 34 in the support plate 30 at approximately the mid-point thereof. A cutting blade 78 is mounted in a head 80 which is mounted on the end of the piston rod 76. An additional guide rod 82 is also secured to the head 80 and is slidably disposed within a guide aperture 84 in the block 86 in which the pneumatic unit 70 is mounted.

In operation, a plastic bag is opened and drawn over the free end of the supporting arm 26 as best shown in FIG. 3. At this time the heat-sealing head 36 is retracted downwardly to its lowermost position, the vacuum head 60 is raised to its uppermost position and the knife 78 is also raised to its uppermost position as best seen in FIG. 3. A patch 14 is positioned on the pressure pad 68 of the vacuum head 60 and a vacuum is applied to hold the patch in position thereon. By suitable pneumatic switching, not shown, air under pressure is supplied through the fitting 72 of the pneumatic actuator 70 to extend the blade 78 to its lowermost position as shown in FIG. 6 wherein the blade cuts through the plastic material of the bag 10. As mentioned previously a recess 50 is provided within the heat-sealing head 36 so as not to interfere with the blade 78 as it passes through the material. The flow of air under pressure is then shifted to the fitting 74 and the piston within the pneumatic actuator unit 70 is moved upwardly and the blade retracted to the position shown in FIG. 3.

With the bag still held in position on the support surface either manually or by any suitable clamps, not shown, air is then supplied under pressure to the fitting 54 to extend the piston rod 58 downwardly to bring the patch 14 into engagement with the outer surface of the bag 10. Simultaneously, air under pressure is supplied through the conduit 48 to raise the heat-sealing heat 36 into engagement with the inside surface of the bag and current is applied through the leads 52 to heat the head 36. During a continuous production run the current can be maintained in the ON state at all times for the head 36 to keep the same at operating temperature. The upper surface of the heat-sealing head 36 is subtantially rectilinear and will engage the plastic bag and completely surround the slit previously formed by the blade 78. The upward movement of the heat-sealing head 36 and the downward movement of the pressure pad 68 force the patch 14 and the plastic material of the bag 10 into engagement for a predetermined length of time sufficient to provide a heat-seal therebetween. The pressurized air is then removed from the conduit 48 allowing the heat-sealing head 36 to be retracted downwardly either under the influence of its own weight or by spring means, not shown, disposed within the pneumatic actuator 42. The air under pressure will be supplied to the fitting 56 of the pneumatic actuator 52 to raise the vacuum head 60 from the position shown in FIG. 7 to the position shown in FIG. 3. The bag may now be removed from the support arm 26 and the patch will be secured to the bag in the manner best shown in FIGS. 1 and 2. The bag may now be filled with the articles to be sterilized and the open edges of the bag sealed together by any suitable heat-sealing apparatus.

The exact shape of the patch and the configuration of the heat-sealing head may be varied within the scope and the present invention and hydraulic or electrical actuators may obviously be substituted for the pneumatic actuators 42, 52 and 70.

While the invention has been particularly shown and described with reference to a preferred embodiment thereof it will be understood by those in the art that the foregoing and other changes in form and details may be made therein without departing from the spirit and scope of the invention.

What is claimed is:

1. A machine for perforating a plastic sheet and securing a patch of the plastic sheet over said perforation comprise support means for holding the plastic sheet in position, cutting means located above said support means and movable downwardly to perforate the plastic sheet, heat-sealing means movably mounted below said support means for vertical movement upwardly into engagement with said plastic sheet and patch applying means movably mounted vertically above said heat-sealing means for moving said patch into engagement with said plastic sheet opposite said heat-sealing head and for pressing said patch and plastic sheet against said head, the axes of movement of said cutting means and said patch applying means intersecting at said support means.

2. A machine as set forth in claim 1 wherein said support means is comprised of a support plate having an aperture therethrough at the point of intersection of the axes of movement of said cutting means and said patch applying means and said heat-sealing means is comprised of a lever pivotally mounted beneath said support plate for pivotal movement about a horizontal axis, heat-sealing head means mounted on said lever and adapted to be moved in a substantially vertical path upwardly and downwardly through said aperture and means for pivoting said lever.

3. A machine as set forth in claim 1 wherein said patch applying means is comprised of a vertically reciprocating rod, means for reciprocating said rod, vacuum head means secured to the lowermost end of said rod for holding a patch on the lower surface thereof and for pressing said patch along with said plastic sheet into engagement with said heat-sealing means.

4. A machine as set forth in claim 1 wherein said patch applying means is adapted to be reciprocated along a vertical axis and said cutting means is comprised of reciprocating rod means the axis of which intersects the vertical axis of reciprocation of said patch applying means at said support means, means for reciprocating said rod and cutting blade means secured to the end of said rod.

5. A machine as set forth in claim 4 wherein said heat-sealing means is comprised of a heat-sealing pad having a central recess therein surrounded by heat-sealing surfaces so that said cutting blade means is adapted to extend into said subsequent to penetration of said plastic sheet material.

* * * * *